(12) United States Patent
Miyahara

(10) Patent No.: US 11,679,810 B2
(45) Date of Patent: Jun. 20, 2023

(54) VEHICLE BODY SIDE STRUCTURE

(71) Applicant: HONDA MOTOR CO., LTD., Tokyo (JP)

(72) Inventor: Koji Miyahara, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/592,533

(22) Filed: Feb. 4, 2022

(65) Prior Publication Data

US 2022/0306210 A1 Sep. 29, 2022

(30) Foreign Application Priority Data

Mar. 29, 2021 (JP) ............................. JP2021-055178

(51) Int. Cl.
*B62D 25/04* (2006.01)
*B62D 25/06* (2006.01)
*B62D 27/02* (2006.01)

(52) U.S. Cl.
CPC ............. *B62D 25/04* (2013.01); *B62D 25/06* (2013.01); *B62D 27/023* (2013.01)

(58) Field of Classification Search
CPC ........ B62D 25/04; B62D 25/02; B62D 25/06; B62D 27/023
USPC .................... 296/193.06, 210, 203.03, 29, 30
See application file for complete search history.

(56) References Cited

U.S. PATENT DOCUMENTS 7,407,222 B2 * 8/2008 Anderson .............. B62D 25/04
296/193.06

FOREIGN PATENT DOCUMENTS

| JP | 42-004731 | 3/1967 |
| JP | 2016-168881 | 9/2016 |
| JP | 2020-183188 | 11/2020 |
| WO | 2012/101783 | 8/2012 |

OTHER PUBLICATIONS

Japanese Office Action for Japanese Patent Application No. 2021-055178 dated Nov. 22, 2022.

* cited by examiner

*Primary Examiner* — Dennis H Pedder
(74) *Attorney, Agent, or Firm* — Amin, Turocy & Watson, LLP

(57) ABSTRACT

A vehicle body side structure 1 includes a roof side rail 2, a center pillar 3, a first joint portion 5, a second joint portion 6, and a third joint portion 7. The first joint portion 5 joins a roof side rail outer 22 and a roof side rail inner at a corner portion 10 formed by the roof side rail 2 and the center pillar 3. The second joint portion 6 joins a center pillar outer 32 and a roof side rail inner at the corner portion 10. The third joint portion 7 joins a center pillar inner and the center pillar outer 32 at the corner portion 10. The first joint portion 5, the second joint portion 6, and the third joint portion 7 are continuously provided from an upper side to a lower side.

9 Claims, 4 Drawing Sheets

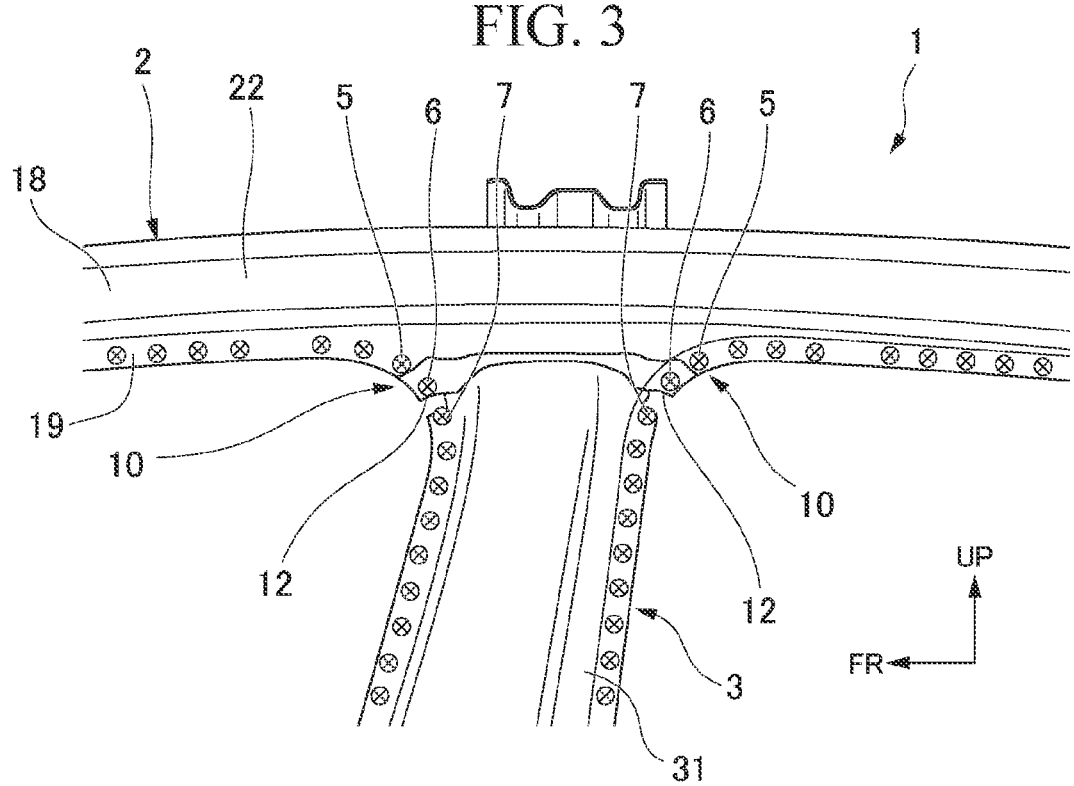
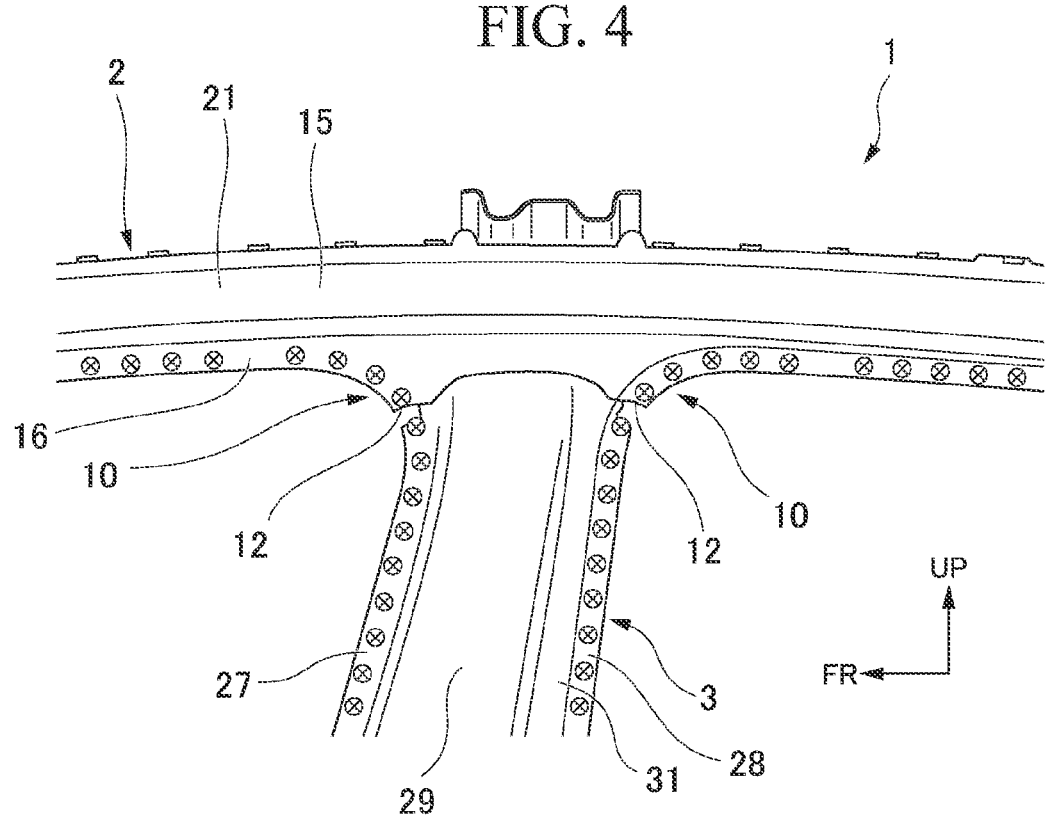

VEHICLE BODY SIDE STRUCTURE

CROSS-REFERENCE TO RELATED APPLICATION

Priority is claimed on Japanese Patent Application No. 2021-055178, filed Mar. 29, 2021, the content of which is incorporated herein by reference.

BACKGROUND OF THE INVENTION

Field of the Invention

The present invention relates to a vehicle body side structure.

Description of Related Art

Conventionally, vehicle body side structures are known, in which a center pillar and a roof side rail are connected to each other in a T shape by a center pillar that extends in a vertical direction of a vehicle and a roof side rail that is connected to an upper end portion of the center pillar and extends in a longitudinal direction thereof. In these vehicle body side structures, various techniques for increasing rigidity against a load when a load is input from a side of the vehicle have been proposed.

For example, Patent Document 1 (Japanese Unexamined Patent Application, First Publication No. 2020-183188) discloses a configuration of a vehicle body side structure which includes a roof side rail, a center pillar, and a stiffener that is provided inside the center pillar and extends in a vertical direction. An upper end portion of the stiffener is connected to the roof side rail from an outer side in a vehicle width direction. At the upper end portion of the stiffener, a valley portion recessed inward in the vehicle width direction is provided, and the depth of the valley portion becomes deeper from an upper end portion toward a central portion in a longitudinal direction thereof.

According to the technique described in Patent Document 1, it is possible to increase rigidity of the central portion in the longitudinal direction, which is located on a belt line and should be the most strengthened portion of the stiffener. Further, it is known that rigidity against a load from a side can be increased by inhibiting peeling of the center pillar from the roof side rail when a load is input from the side.

SUMMARY OF THE INVENTION

Incidentally, conventionally, a roof side rail may be formed by overlapping an inner member with an outer member. Similarly, a center pillar may also be formed by overlapping an inner member with an outer member. In this case, a plurality of (for example, four or more) plate members overlap each other at a connection portion between the center pillar and the roof side rail. For this reason, especially at a corner portion between the roof side rail and the center pillar, spot welding or the like cannot be performed on a portion at which the plurality of plate members overlap each other, and it is necessary to perform spot welding or the like while avoiding this portion. However, in a case in which welding is performed while avoiding a part of the corner portion, for example, when a load is input from a side, the stress is concentrated on a portion that is not welded and this portion may open. Thus, a joint portion between the center pillar and the roof side rail may be broken or peeled off, and the rigidity of a vehicle body side structure may decrease.

Accordingly, in the conventional technique described in Patent Document 1, there is room for improvement in inhibiting opening at a connection portion between the center pillar and the roof side rail and further improving the rigidity against an input load.

Therefore, an object of the present invention is to provide a vehicle body side structure in which generation of opening at a connection portion between a center pillar and a roof side rail can be inhibited, and rigidity against an input load from a side can be further improved as compared with conventional techniques.

In order to solve the above problems, a vehicle body side structure according to the present invention has the following configurations.

(1) A vehicle body side structure according to one aspect of the present invention includes: a roof side rail that extends in a longitudinal direction of a vehicle on an upper side and on a side of the vehicle and has a roof side rail inner disposed on a vehicle interior side and a roof side rail outer disposed on a vehicle exterior side; a center pillar that extends from the roof side rail to a lower side of the vehicle and has a center pillar inner disposed on the vehicle interior side and a center pillar outer disposed on the vehicle exterior side; a first joint portion that joins the roof side rail outer and the roof side rail inner at a corner portion provided at an upper end portion of the center pillar and formed by the roof side rail and the center pillar; a second joint portion that joins the center pillar outer and the roof side rail inner at the corner portion; and a third joint portion that joins the center pillar inner and the center pillar outer at the corner portion, in which the first joint portion, the second joint portion, and the third joint portion are continuously provided from the upper side to the lower side.

(2) In the vehicle body side structure according to the above aspect (1), a first gap may be provided between the roof side rail outer and the center pillar outer at the corner portion when viewed from the side, and a second gap may be provided between the roof side rail inner and the center pillar inner at the corner portion when viewed from the side.

(3) In the vehicle body side structure according to the above aspect (2), the first gap and the second gap may be provided at different positions in a vertical direction of the vehicle when viewed from the side.

(4) In the vehicle body side structure according to the above aspect (1), a patch member that is provided between the roof side rail outer and the roof side rail inner in a vehicle width direction of the vehicle and extends in the longitudinal direction may be provided.

(5) In the vehicle body side structure according to the above aspect (4), an upper end portion of the center pillar outer may extend to a central portion of the patch member in the vertical direction of the vehicle.

According to the aspect (1), the roof side rail and the center pillar can be connected by joining respective plate members at the first joint portion, the second joint portion, and the third joint portion. The first joint portion of four plate members (the roof side rail inner, the roof side rail outer, the center pillar inner, and the center pillar outer) constituting the corner portion joins the roof side rail outer and the roof side rail inner. The second joint portion joins the center pillar outer and the roof side rail inner. The third joint portion joins the center pillar inner and the center pillar outer. In this way, predetermined two plate members of the four plate members overlap each other at each joint portion, and thus as compared with a case in which four plate members overlap each other, the number of plates to be joined at the joint portions can be reduced. Thus, spot welding and the like can be reliably performed at each joint portion.

The first joint portion, the second joint portion, and the third joint portion are continuously provided from the upper side to the lower side. Thus, an interval for spot welding at the corner portion can be narrowed, and spot welding can be performed at the minimum interval. Accordingly, as compared with a conventional technique of welding while avoiding a part of the corner portion or welding with a larger spot welding interval, it is possible to inhibit generation of opening when a load is input from the side. Thus, even in a case in which the load is input from the side of the vehicle, it is possible to inhibit breakage and peeling of the center pillar and the roof side rail at the corner portion of the vehicle body side structure and improve rigidity of the vehicle body side structure.

Accordingly, the vehicle body side structure in which the generation of the opening at the connection portion between the center pillar and the roof side rail can be inhibited, and the rigidity against the input load from the side can be further improved as compared with conventional techniques can be provided.

According to the aspect (2), the first gap is provided between the roof side rail outer and the center pillar outer at the corner portion. The second gap is provided between the roof side rail inner and the center pillar inner at the corner portion. By providing the first gap and the second gap, interference between the plate members can be inhibited. Thus, an unintended increase in the number of plates to be joined at the joint portion due to overlapping of the plate members other than the predetermined plate members can be inhibited. Accordingly, the number of plates to be joined at each joint portion can be reliably reduced, and welding can be performed stably.

According to the aspect (3), the first gap and the second gap are provided at different positions in the vertical direction. Since the first gap and the second gap are formed not to overlap each other, a portion in which a plate member is missing is not formed at the corner portion. That is, in a case in which the first gap and the second gap overlap each other, rigidity of the corner portion may decrease due to formation of a fragile portion in which there is no plate member in the overlapped portion. On the other hand, in a case in which the first gap and the second gap are provided at different positions, the fragile portion is not formed. Accordingly, a decrease in the rigidity of the corner portion due to provision of the first gap and the second gap can be inhibited. Further, it is possible to inhibit a stress from being concentrated on the corner portion to cause damage when a load is input from the side. Accordingly, the rigidity of the vehicle body side structure can be maintained at a high level.

According to the aspect (4), the patch member is provided between the roof side rail outer and the roof side rail inner in the vehicle width direction and extends in the longitudinal direction. Thus, the patch member can be provided without increasing the number of plates to be joined at the corner portion. The rigidity of the roof side rail can be increased by the patch member. Thus, for example, when a load is input from the side of the vehicle, the load transmitted from the center pillar to the roof side rail can also be received by the patch member. Accordingly, it is possible to inhibit breakage or the like of the roof side rail and effectively transmit the load.

According to the aspect (5), the upper end portion of the center pillar outer extends to the central portion of the patch member. Thus, the load transmitted from the center pillar can be reliably received by the patch member, and the load can be effectively transmitted to the roof side rail. Since the position of the upper end portion of the center pillar can be set to the central portion of the patch member, the length of the center pillar can be kept short. For example, the length of the center pillar can be shortened as compared with the case in which the center pillar is extended to the vicinity of an upper end portion of the roof side rail in order to reliably transmit the load to the roof side rail. Accordingly, it is possible to inhibit an increase in weight and cost of the center pillar while ensuring rigidity.

BRIEF DESCRIPTION OF THE DRAWINGS

FIG. 3 is a side view of the vehicle body side structure in which illustration of a center pillar outer in FIG. 2 is omitted.

FIG. 4 is a side view of the vehicle body side structure in which illustration of a roof side rail outer in FIG. 3 is omitted.

DETAILED DESCRIPTION OF THE INVENTION

Figure 1:
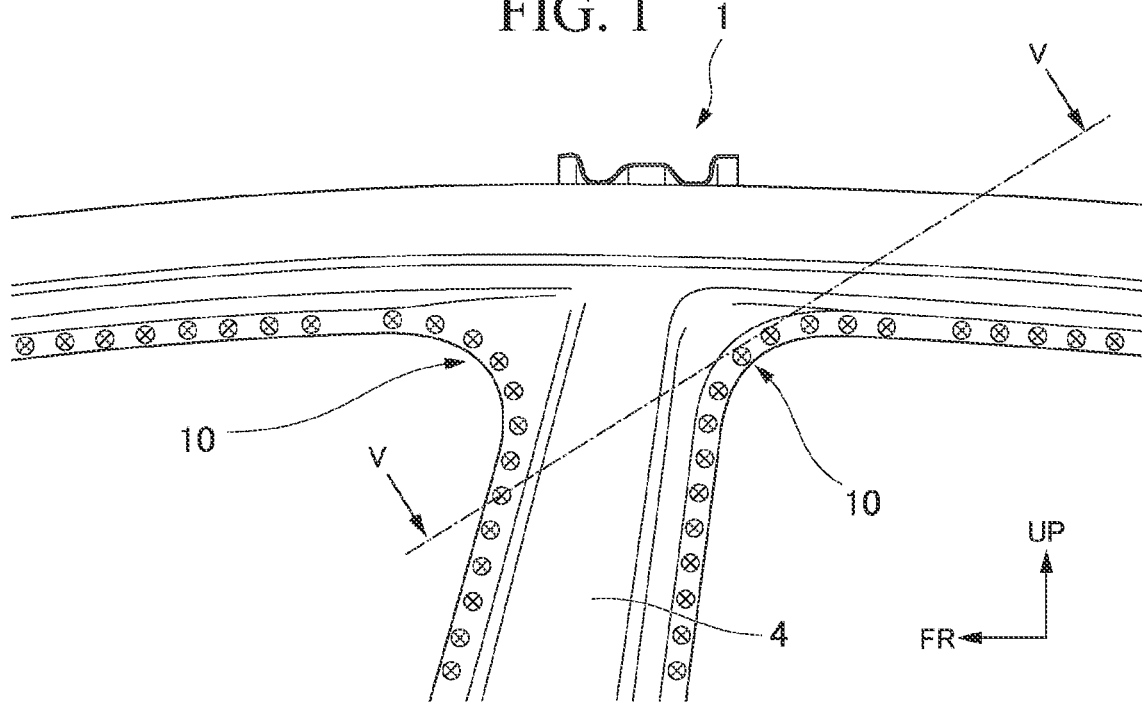
FIG. 1 is a side view of a vehicle body side structure according to an embodiment.

An embodiment of the present invention will be described below with reference to the drawings. In the following description, longitudinal, lateral, and vertical directions coincide with longitudinal, lateral, and vertical directions of a vehicle (for example, an automobile) having a vehicle body side structure 1. The lateral direction may be referred to as a vehicle width direction. In the drawings, arrow FR indicates forward in the vehicle, arrow UP indicates upward in the vehicle, and arrow LH indicates leftward in the vehicle.

(Vehicle Body Side Structure)

Figure 2:
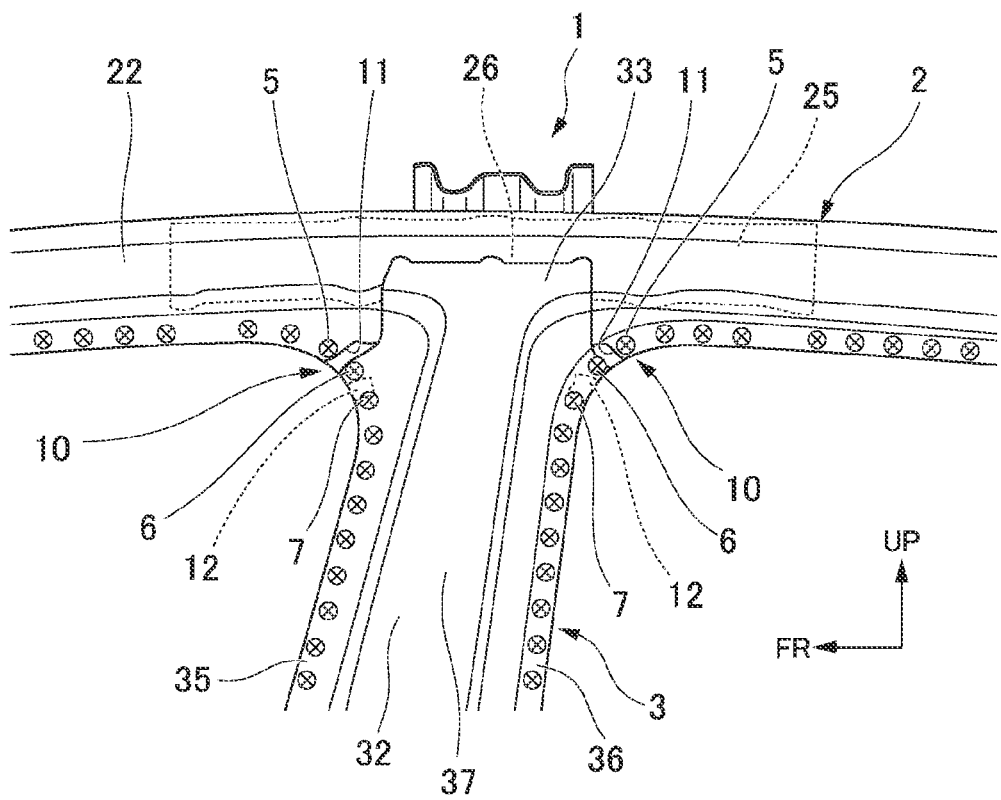
FIG. 2 is a side view of the vehicle body side structure in which illustration of a side panel in FIG. 1 is omitted.

FIG. 1 is a side view of the vehicle body side structure 1 according to an embodiment. FIG. 2 is a side view of the vehicle body side structure 1 in which illustration of a side panel 4 in FIG. 1 is omitted. FIG. 3 is a side view of the vehicle body side structure 1 in which illustration of a center pillar outer 32 in FIG. 2 is omitted. FIG. 4 is a side view of the vehicle body side structure 1 in which illustration of a roof side rail outer 22 in FIG. 3 is omitted. The vehicle body side structure 1 constitutes, for example, a side portion of a vehicle body of an automobile or the like (a vehicle). The vehicle body side structure 1 is provided on each of left and right side portions of the vehicle body. Left and right vehicle body side structures 1 have symmetrical structures, and thus in the following embodiment, the left vehicle body side structure 1 will be described, and description of the right vehicle body side structure 1 may be omitted.

As shown in FIGS. 1 to 4, the vehicle body side structure 1 of the present embodiment shows a structure on a roof side (an upper side) of the side portion of the vehicle body. The vehicle body side structure 1 includes a roof side rail 2, a patch member 25, a center pillar 3, a side panel 4, a plurality of gaps 11 and 12, and the plurality of joint portions 5, 6, and 7.

(Roof Side Rail)

Figure 5:
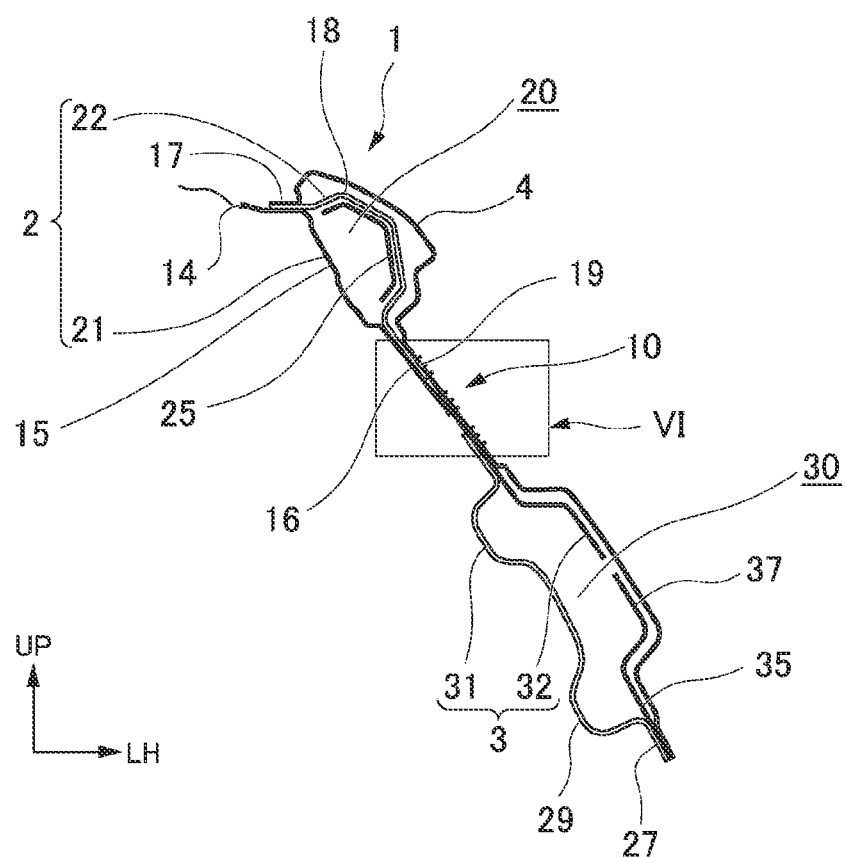
FIG. 5 is a cross-sectional view along line V-V in FIG. 1.

FIG. 5 is a cross-sectional view along line V-V in FIG. 1.

As shown in FIGS. 2 and 5, the roof side rail 2 extends in the longitudinal direction of the vehicle on an upper side and a side of the vehicle. The roof side rail 2 is, for example, a framework member made of a plurality of metal materials. As shown in FIG. 5, the roof side rail 2 has a roof side rail inner 21 and a roof side rail outer 22. By assembling the roof side rail inner 21 and the roof side rail outer 22, the roof side rail 2 is formed to have a closed cross-section 20 in a cross-sectional view orthogonal to the longitudinal direction.

As shown in FIGS. 4 and 5, the roof side rail inner 21 is disposed on an inner side (a vehicle interior side) in the vehicle width direction. The roof side rail inner 21 extends in the longitudinal direction. The roof side rail inner 21 has an upper wall portion 14 and a lower wall portion 15. The upper wall portion 14 is formed in a plate shape that extends in the longitudinal direction and the lateral direction with the vertical direction defined as a perpendicular-to-surface direction. The upper wall portion 14 is connected to a roof of the vehicle body. The lower wall portion 15 is connected to an outer end portion of the upper wall portion 14 in the vehicle width direction. The lower wall portion 15 extends diagonally outward and downward in the vehicle width direction from the outer end portion of the upper wall portion 14 in the vehicle width direction. The lower wall portion 15 is formed in a plate shape. The upper wall portion 14 and the lower wall portion 15 are integrally formed. A lower end portion of the lower wall portion 15 is a flange portion 16 joined to the roof side rail outer 22, which will be described later.

As shown in FIG. 4, when viewed from the side of the vehicle, the roof side rail inner 21 constitutes upper portions of corner portions 10 formed by connecting the roof side rail 2 and the center pillar 3. The corner portions 10 are provided in front of and behind the center pillar 3. When viewed from the side, the corner portions 10 are formed in curved shapes so that a lower edge portion of the roof side rail 2 and front and rear edge portions of the center pillar 3 are smoothly continuous with each other. Accordingly, a part of the roof side rail inner 21 (the lower edge portion corresponding to the corner portion 10) is curved along an arc shape of the corner portion 10.

As shown in FIGS. 3 and 5, the roof side rail outer 22 is disposed on an outer side (a vehicle exterior side) in the vehicle width direction with respect to the roof side rail inner 21. The roof side rail outer 22 extends in the longitudinal direction. The roof side rail outer 22 has an upper flange 17, a bulging portion 18, and a lower flange 19.

The upper flange 17 is formed in a plate shape that extends in the longitudinal direction and the lateral direction with the vertical direction defined as a perpendicular-to-surface direction. The upper flange 17 extends along the upper wall portion 14 of the roof side rail inner 21. The upper flange 17 is joined to an upper surface of the upper wall portion 14 of the roof side rail inner 21 by, for example, spot welding.

The bulging portion 18 is connected to an outer end portion of the upper flange 17 in the vehicle width direction. The bulging portion 18 bulges outward in the vehicle width direction to be convex in a cross-sectional view orthogonal to a longitudinal direction of the roof side rail 2. A closed cross-section 20 is formed between the bulging portion 18 and the lower wall portion 15 of the roof side rail 2.

The lower flange 19 is connected to a lower end portion of the bulging portion 18. The lower flange 19 extends diagonally outward and downward in the vehicle width direction from the lower end portion of the bulging portion 18. The lower flange 19 extends along the flange portion 16 of the roof side rail inner 21. The lower flange 19 is joined to the flange portion 16 of the roof side rail inner 21 by, for example, spot welding.

Similarly to the roof side rail inner 21, a lower edge of the roof side rail outer 22 constitutes the upper portion of the corner portion 10.

(Patch Member)

As shown in FIGS. 2 and 5, the patch member 25 is provided in the closed cross-section 20 between the roof side rail inner 21 and the roof side rail outer 22 in the vehicle width direction. Specifically, the patch member 25 is attached to a surface of the bulging portion 18 of the roof side rail outer 22 that faces inward in the vehicle width direction (a surface that faces the inside of the closed cross-section 20). The patch member 25 is provided at a portion (connection point) at which the roof side rail 2 and the center pillar 3 intersect in the longitudinal direction. The patch member 25 extends in the longitudinal direction from at least the connection point between the roof side rail 2 and the center pillar 3 over the front and rear corner portions 10. The patch member 25 is formed to be convex outward in the vehicle width direction along the bulging portion 18 in a cross-sectional view.

(Center Pillar)

As shown in FIGS. 2 to 4, the center pillar 3 extends in the vertical direction on the side of the vehicle and at a central portion thereof in the longitudinal direction. The center pillar 3 is, for example, a framework member made of a plurality of metal materials. An upper end portion of the center pillar 3 is connected to the roof side rail 2. The center pillar 3 extends downward from the roof side rail 2. A lower end portion of the center pillar 3 is connected to a side sill (not shown) that extends in the longitudinal direction on a lower side of the vehicle. The center pillar 3 has a center pillar inner 31 (see FIG. 3) and a center pillar outer 32 (see FIG. 2). By assembling the center pillar inner 31 and the center pillar outer 32, the center pillar 3 is formed to have a closed cross-section 30 (see FIG. 5) in a cross-sectional view orthogonal to the vertical direction.

As shown in FIGS. 3 and 5, the center pillar inner 31 is disposed on the inner side (vehicle interior side) in the vehicle width direction. The center pillar inner 31 extends in the vertical direction. The center pillar inner 31 has an inner front flange 27, an inner rear flange 28, and an inner bulging portion 29. By integrally forming the inner front flange 27, the inner rear flange 28, and the inner bulging portion 29, the center pillar inner 31 is formed in a hat-like cross-sectional shape when viewed in the vertical direction.

The inner front flange 27 and the inner rear flange 28 are provided to be separated from each other in the longitudinal direction. The inner front flange 27 and the inner rear flange 28 extend in the vertical direction and the longitudinal direction. The inner bulging portion 29 is provided between the inner front flange 27 and the inner rear flange 28. The inner bulging portion 29 is connected to the inner front flange 27 and the inner rear flange 28. The inner bulging portion 29 bulges toward the vehicle interior side to be located inward in the vehicle width direction with respect to the inner front flange 27 and the inner rear flange 28. With the center pillar 3 and the roof side rail 2 connected to each other, upper end portions of the inner front flange 27 and the inner rear flange 28 form lower portions of the corner portion 10.

As shown in FIGS. 2 and 5, the center pillar outer 32 is disposed on the outer side (vehicle exterior side) in the vehicle width direction with respect to the center pillar inner 31. The center pillar outer 32 extends in the vertical direction. The center pillar outer 32 has an outer front flange 35, an outer rear flange 36, and an outer bulging portion 37. By integrally forming the outer front flange 35, the outer rear flange 36, and the outer bulging portion 37, the center pillar outer 32 is formed in a hat-like cross-sectional shape when viewed in the vertical direction.

The outer front flange 35 and the outer rear flange 36 are provided to be separated from each other in the longitudinal direction. The outer front flange 35 and the outer rear flange 36 extend in the vertical direction and the longitudinal direction. The outer front flange 35 and the outer rear flange 36 are joined to the inner front flange 27 and the inner rear flange 28 of the center pillar inner 31 by spot welding. The outer bulging portion 37 is provided between the outer front flange 35 and the outer rear flange 36. The outer bulging portion 37 is connected to the outer front flange 35 and the outer rear flange 36. The outer bulging portion 37 bulges toward the vehicle exterior side to be located outward in the vehicle width direction with respect to the outer front flange 35 and the outer rear flange 36. With the center pillar 3 and the roof side rail 2 connected to each other, upper end portions of the outer front flange 35 and the outer rear flange 36 form the lower portions of the corner portions 10.

The above-mentioned four plate members constituting the roof side rail 2 and the center pillar 3 overlap each other in the order of the center pillar inner 31, the roof side rail inner 21, the roof side rail outer 22, and the center pillar outer 32 from the inner side to the outer side in the vehicle width direction.

As shown in FIG. 2, with the center pillar 3 connected to the roof side rail 2, an upper end portion 33 of the center pillar outer 32 is terminated below an upper end portion of the roof side rail 2. More specifically, the upper end portion 33 of the center pillar outer 32 extends to a central portion 26 of the patch member 25 in the vertical direction. Accordingly, the patch member 25 can receive a load input to the center pillar outer 32.

(Side Panel)

As shown in FIGS. 1 and 5, the side panel 4 is formed in a T shape along the roof side rail 2 and the center pillar 3 when viewed from the side. The side panel 4 covers the roof side rail 2 and the center pillar 3 from the outer side in the vehicle width direction. An edge portion of the side panel 4 is joined to the roof side rail 2 or the center pillar 3 by, for example, spot welding.

(Plurality of Gaps)

As shown in FIG. 2, the plurality of gaps 11 and 12 are provided in the corner portions 10 formed by joining the roof side rail 2 and the center pillar 3. The plurality of gaps have first gaps 11 and second gaps 12.

The first gaps 11 are provided between the roof side rail outer 22 and the center pillar outer 32 at the corner portions 10. When viewed from the side, the first gaps 11 are formed by cutting at least one of the roof side rail outer 22 and the center pillar outer 32 toward outer peripheral sides (member sides) of the corner portions 10. That is, at the portions at which the first gaps 11 are provided, edge portions of the roof side rail outer 22 and the center pillar outer 32 do not overlap each other when viewed from the side. One first gap 11 is provided at each of the front and rear corner portions 10.

As shown in FIGS. 3 and 4, the second gaps 12 are provided between the roof side rail inner 21 and the center pillar inner 31 at the corner portions 10. When viewed from the side, the second gaps 12 are formed by cutting at least one of the roof side rail inner 21 and the center pillar inner 31 toward the outer peripheral sides (member sides) of the corner portions 10. That is, at the portions at which the second gaps 12 are provided, edge portions of the roof side rail inner 21 and the center pillar inner 31 do not overlap each other when viewed from the side. One second gap 12 is provided at each of the front and rear corner portions 10.

As shown in FIG. 2, when viewed from the side, the first gaps 11 and the second gaps 12 are provided at different positions in the vertical direction of the vehicle. In other words, the first gaps 11 and the second gaps 12 do not overlap when viewed from the side. The first gaps 11 are provided above the second gaps 12.

(Plurality of Joint Portions)

The plurality of joint portions 5, 6, and 7 join at least one of the roof side rail 2, the center pillar 3, and the side panel 4 described above. In the present embodiment, the plurality of joint portions 5, 6, and 7 are provided at the edge portions of the roof side rail 2, the center pillar 3 and the side panel 4 to join predetermined members to each other by spot welding. In the present embodiment, the plurality of joint portions include first joint portions 5, second joint portions 6, and third joint portions 7. The first joint portions 5, the second joint portions 6, and the third joint portions 7 are provided at positions which are at the upper end portion of the center pillar 3 and correspond to the corner portions 10.

The first joint portions 5 join three plate members of the roof side rail outer 22, the roof side rail inner 21, and the side panel 4 at the corner portions 10. The first joint portions 5 are provided above the first gaps 11. In other words, the first joint portions 5 join the roof side rail outer 22 and the roof side rail inner 21 at the edge portion of the roof side rail 2 located above the first gaps 11 by spot welding. Above the first joint portions 5, the roof side rail outer 22, the roof side rail inner 21, and the side panel 4 are joined by spot welding at the edge portion.

The second joint portions 6 join three plate members of the center pillar outer 32, the roof side rail inner 21, and the side panel 4 at the corner portions 10. The second joint portions 6 are provided between the first gaps 11 and the second gaps 12 in the vertical direction. In other words, the second joint portions 6 join the center pillar outer 32 and the roof side rail inner 21 by spot welding at the edge portions of the center pillar 3 and the roof side rail 2 located between the first gaps 11 and the second gaps 12.

The third joint portions 7 join three plate members of the center pillar inner 31, the center pillar outer 32, and the side panel 4 at the corner portions 10. The third joint portions 7 are provided below the second gaps 12 in the vertical direction. In other words, the third joint portions 7 join the center pillar inner 31 and the center pillar outer 32 by spot welding at the edge portion of the center pillar 3 located below the second gaps 12. Below the third joint portions 7, the center pillar inner 31, center pillar outer 32, and side panel 4 are joined by spot welding at their respective edge portions.

Figure 6:
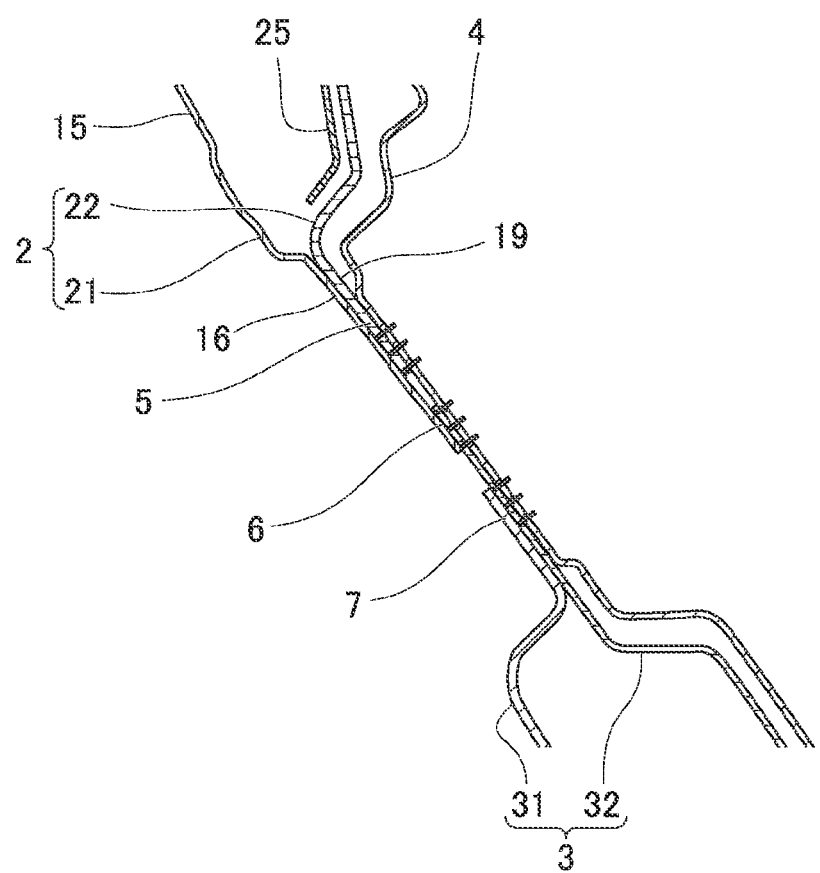
FIG. 6 is an enlarged view of section VI in FIG. 5.

FIG. 6 is an enlarged view of section VI in FIG. 5.

As shown in FIGS. 2 and 6, the first joint portions 5, the second joint portions 6 and the third joint portions 7 are continuously provided from the upper side to the lower side. That is, the first joint portions 5, the second joint portions 6, and the third joint portions 7 are provided to be separated from each other by a predetermined welding pitch in spot welding continuously formed at the predetermined welding pitch. The first gaps 11 and the second gaps 12 are preferably formed to be smaller than the predetermined welding pitch.

(Operations and Effects)

Next, operations and effects of the vehicle body side structure 1 described above will be described.

According to the vehicle body side structure 1 of the present embodiment, the roof side rail 2 and the center pillar can be connected by joining respective plate members at the first joint portions 5, the second joint portions 6, and the third joint portions 7. The first joint portions 5 join the roof side rail outer 22 and the roof side rail inner 21 of four plate members (the roof side rail inner 21, the roof side rail outer 22, the center pillar inner 31, and the center pillar outer 32) constituting the corner portions 10. The second joint portions 6 join the center pillar outer 32 and the roof side rail inner 21. The third joint portions 7 join the center pillar inner 31 and the center pillar outer 32. In this way, predetermined two plate members of the four plate members overlap each other at each of the joint portions 5, 6 and 7, and thus as compared to the case of overlapping four plate members, the number of plates to be joined at the joint portions 5, 6, and 7 can be reduced. Thus, spot welding and the like can be reliably performed at each of the joint portions 5, 6, and 7.

The first joint portions 5, the second joint portions 6, and the third joint portions 7 are continuously provided from the upper side to the lower side. Thus, an interval for spot welding in the corner portions 10 can be narrowed, and spot welding can be performed at the minimum interval. Accordingly, as compared with conventional techniques of welding while avoiding a part of the corner portion 10 or welding with a larger spot welding interval, it is possible to inhibit generation of opening when a load is input from the side. Thus, even when the load is input from the side of the vehicle, breakage or peeling of the center pillar 3 and the roof side rail 2 in the corner portion 10 of the vehicle body side structure 1 can be inhibited, and rigidity of the vehicle body side structure 1 can be improved.

Accordingly, it is possible to provide the vehicle body side structure 1 in which generation of opening at the connection portion between the center pillar 3 and the roof side rail 2 can be inhibited, and rigidity against an input load from the side can be further improved as compared with conventional techniques.

In the corner portions 10, the first gaps 11 are provided between the roof side rail outer 22 and the center pillar outer 32. In the corner portions 10, the second gaps 12 are provided between the roof side rail inner 21 and the center pillar inner 31. By providing the first gaps 11 and the second gaps 12, interference between the plate members can be inhibited. Thus, an unintended increase in the number of plates to be joined at the joint portions 5, 6, and 7 due to overlapping of plate members other than the predetermined plate members can be inhibited. Accordingly, the number of plates to be joined at each of the joint portions 5, 6, and 7 can be reliably reduced, and welding can be performed stably.

The first gaps 11 and the second gaps 12 are provided at different positions in the vertical direction. Since the first gaps 11 and the second gaps 12 are formed not to overlap each other, a portion in which a plate member is missing is not formed in the corner portions 10. That is, in a case in which the first gaps 11 and the second gaps 12 overlap each other, rigidity of the corner portion 10 may decrease due to formation of a fragile portion in which there is no plate member in the overlapped portion. On the other hand, in a case in which the first gaps 11 and the second gaps 12 are provided at different positions, the fragile portion is not formed. Accordingly, it is possible to inhibit a decrease in the rigidity of the corner portion 10 by providing the first gaps 11 and the second gaps 12. Further, it is possible to inhibit a stress from being concentrated on the corner portion 10 to cause damage when the load is input from the side. Accordingly, the rigidity of the vehicle body side structure 1 can be maintained at a high level.

The patch member 25 is provided between the roof side rail outer 22 and the roof side rail inner 21 in the vehicle width direction and extends in the longitudinal direction. Thus, the patch member 25 can be provided without increasing the number of plates to be joined in the corner portion 10. The rigidity of the roof side rail 2 can be increased by the patch member 25. Thus, for example, when a load is input from the side of the vehicle, the load transmitted from the center pillar 3 to the roof side rail 2 can also be received by the patch member 25. Accordingly, it is possible to inhibit breakage or the like of the roof side rail 2 and effectively transmit the load.

The upper end portion 33 of the center pillar outer 32 extends to the central portion 26 of the patch member 25. Thus, the load transmitted from the center pillar 3 can be reliably received by the patch member 25, and the load can be effectively transmitted to the roof side rail 2. Since the position of the upper end portion 33 of the center pillar 3 can be set to the central portion 26 of the patch member 25, a length of the center pillar 3 can be kept short. For example, the length of the center pillar 3 can be shortened as compared with the case in which the center pillar 3 extends to the vicinity of the upper end portion of the roof side rail 2 in order to reliably transmit the load to the roof side rail 2. Accordingly, it is possible to inhibit an increase in weight and cost of the center pillar 3 while ensuring rigidity.

Also, the technical scope of the present invention is not limited to the above-described embodiment, and various changes can be made without departing from the spirit of the present invention.

For example, in the above-described embodiment, the first gaps 11 are provided above the second gaps 12, but the present invention is not limited thereto. The first gaps 11 may be provided below the second gaps 12.

In the cross-sectional view of the roof side rail 2, the shapes of the roof side rail inner 21 and the roof side rail outer 22 are not limited to the above-mentioned shapes. The roof side rail 2 may have a configuration in which at least the closed cross-section 20 can be formed by connecting the roof side rail inner 21 to the roof side rail outer 22. Similarly, in the cross-sectional view of the center pillar 3, the shapes of the center pillar inner 31 and the center pillar outer 32 are not limited to the above-mentioned shapes. The center pillar 3 may have a configuration in which at least the closed cross-section 30 can be formed by connecting the center pillar inner 31 to the center pillar outer 32.

The plurality of first joint portions 5 may be formed above the first gaps 11.

The plurality of second joint portions 6 may be formed between the first gaps 11 and the second gaps 12.

The plurality of third joint portions 7 may be formed below the second gaps 12.

In addition, it is possible to appropriately replace constituent elements in the above-described embodiment with well-known constituent elements without departing from the spirit of the present invention, and the above-mentioned embodiments may be combined as appropriate.

EXPLANATION OF REFERENCES

1 Vehicle body side structure
2 Roof side rail
3 Center pillar
5 First joint portion
6 Second joint portion 7 Third joint portion
10 Corner portion
11 First gap
12 Second gap
21 Roof side rail inner
22 Roof side rail outer
25 Patch member
26 Central portion (of patch member)
31 Center pillar inner
32 Center pillar outer
33 Upper end portion (of center pillar outer)

What is claimed is:

1. A vehicle body side structure comprising:
a roof side rail that extends in a longitudinal direction of a vehicle on an upper side and on a side of the vehicle and has a roof side rail inner disposed on a vehicle interior side and a roof side rail outer disposed on a vehicle exterior side;
a center pillar that extends from the roof side rail to a lower side of the vehicle and has a center pillar inner disposed on the vehicle interior side and a center pillar outer disposed on the vehicle exterior side;
a first joint portion that joins the roof side rail outer and the roof side rail inner at a corner portion provided at an upper end portion of the center pillar and formed by the roof side rail and the center pillar;
a second joint portion that joins the center pillar outer and the roof side rail inner at the corner portion; and
a third joint portion that joins the center pillar inner and the center pillar outer at the corner portion,
wherein the first joint portion, the second joint portion, and the third joint portion are continuously provided from the upper side to the lower side,
a first gap is provided between the roof side rail outer and the center pillar outer at the corner portion when viewed from the side, and
a second gap is provided between the roof side rail inner and the center pillar inner at the corner portion when viewed from the side.

2. The vehicle body side structure according to claim 1, wherein the first gap and the second gap are provided at different positions in a vertical direction of the vehicle when viewed from the side.

3. The vehicle body side structure according to claim 1, further comprising a patch member that is provided between the roof side rail outer and the roof side rail inner in a vehicle width direction of the vehicle and extends in the longitudinal direction.

4. The vehicle body side structure according to claim 3, wherein an upper end portion of the center pillar outer extends to a central portion of the patch member in the vertical direction of the vehicle.

5. A vehicle body side structure comprising:
a roof side rail that extends in a longitudinal direction of a vehicle on an upper side and on a side of the vehicle and has a roof side rail inner disposed on a vehicle interior side and a roof side rail outer disposed on a vehicle exterior side;
a center pillar that extends from the roof side rail to a lower side of the vehicle and has a center pillar inner disposed on the vehicle interior side and a center pillar outer disposed on the vehicle exterior side;
a side panel that covers the roof side rail and the center pillar from an outer side in a vehicle width direction;
a first joint portion that joins only the roof side rail outer and the roof side rail inner and the side panel among a five elements of the roof side rail inner, the roof side rail outer, the center pillar inner, the center pillar outer and the side panel at a corner portion provided at an upper end portion of the center pillar and formed by the roof side rail and the center pillar;
a second joint portion that joins only the center pillar outer and the roof side rail inner and the side panel among the five elements at the corner portion; and
a third joint portion that joins only the center pillar inner and the center pillar outer and the side panel among the five elements at the corner portion,
wherein the first joint portion, the second joint portion, and the third joint portion are continuously provided from the upper side to the lower side.

6. The vehicle body side structure according to claim 5, wherein a first gap is provided between the roof side rail outer and the center pillar outer at the corner portion when viewed from the side, and
a second gap is provided between the roof side rail inner and the center pillar inner at the corner portion when viewed from the side.

7. The vehicle body side structure according to claim 6, wherein the first gap and the second gap are provided at different positions in a vertical direction of the vehicle when viewed from the side.

8. The vehicle body side structure according to claim 5, further comprising a patch member that is provided between the roof side rail outer and the roof side rail inner in a vehicle width direction of the vehicle and extends in the longitudinal direction.

9. The vehicle body side structure according to claim 8, wherein an upper end portion of the center pillar outer extends to a central portion of the patch member in the vertical direction of the vehicle.

* * * * *